United States Patent

[11] 3,558,915

[72] Inventors Peter Wood;
 John Rosa, Pittsburgh, Pa.
[21] Appl. No. 709,634
[22] Filed Mar. 1, 1968
[45] Patented Jan. 26, 1971
[73] Assignee Westinghouse Electric Corporation
 Pittsburgh, Pa.
 a corporation of Pennsylvania

[54] SELECTIVE PHASE ANGLE PULSE-GENERATING CIRCUIT
 10 Claims, 2 Drawing Figs.

[52] U.S. Cl. .................................................. 307/232,
 307/262, 328/149, 328/151
[51] Int. Cl. .................................................. H03d 3/02
[50] Field of Search .......................................... 307/232,
 310, 262; 328/147, 149, 151, 109; 219/10.75,
 10.77, (Inquired); 329/(Inquired)

[56] References Cited
UNITED STATES PATENTS
| 2,700,093 | 1/1955 | Gordon | 219/10.77 |
| 2,945,112 | 7/1960 | Scott | 219/10.77 |
| 3,315,169 | 4/1967 | Nitta et al. | 307/232X |
| 3,348,129 | 10/1967 | Schonholzer | 307/262X |
| 3,376,514 | 4/1968 | Womack et al. | 307/232X |

OTHER REFERENCES
ELECTRONICS Aug. 10, 1964 pp 66— 69 & 73 " Helpful transistor Analog 4-Layer pnpn 2 transistors" (copy enclosed)

Primary Examiner—John S. Heyman
Attorneys—F. H. Henson, C. F. Renz and A. S. Oddi ABSTRACT: The present disclosure relates to circuitry for generating output pulses at a selected phase angle with respect to an alternating signal, such as a sinusoid, independent of the amplitude and frequency thereof and wherein the alternating signal may vary over a wide range of amplitudes and frequencies. The pulse-generating circuit is ideally adapted for use in induction heating apparatus of the type which employs an inverter drive including controlled switching devices for supplying an alternating signal to a tuned load including an induction heating coil. The circuit is operative to generate the output pulses by detecting, through peak detection for example, the substantial peak of the alternating signal and comparing a selected portion of the peak value with the instantaneous value of the alternating signal. The comparison is made in a comparison stage, including for example an active device such as a transistor or plurality of transistors, with operating power for the comparison stage being supplied from a separate power supply independent of the alternating signal. An output pulse at the selected phase angle is provided when the compared signals bear a predetermined relationship with respect to each other.

PATENTED JAN 26 1971

3,558,915

WITNESSES:
Helen M. Farkas
James F. Young

INVENTORS
Peter Wood &
John Rosa
BY Samuel O. Li
ATTORNEY 3,558,915

SELECTIVE PHASE ANGLE PULSE-GENERATING CIRCUIT

CROSS-REFERENCE TO RELATED APPLICATIONS

The present application is an improvement on copending application Ser. No. 705,481 filed Feb. 14, 1968 by Peter Wood.

BACKGROUND OF THE INVENTION

The present invention relates to pulse-generating circuitry and, more particularly, to such circuitry for generating pulses at a selected phase angle with respect to an alternating signal which may vary in frequency and amplitude over wide ranges.

In the cited copending application pulse-generating circuitry is described wherein output pulses are generated at a fixed phase angle with respect to each half cycle of an alternating waveform such as a sinusoid. Such circuitry finds ideal application in industrial heating apparatus employing an inverter drive utilizing controlled switching devices for supplying the alternating waveform to a tuned load comprising an induction heating coil and a parallel connected capacitor. The output pulses are generated at a fixed phase angle by comparing a signal proportional to the peak amplitude of the sinusoidal waveform with the instantaneous value of the waveform through use of a semiconductor device such as a unijunction transistor. When the compared signals reach a predetermined relationship, e.g. the standoff ratio of the unijunction transistor, a gating pulse is generated. Since the ratio of the instantaneous value of the sinusoidal waveform to its peak value is a constant, the output pulse will occur at a fixed phase angle with respect to the sensed half cycle of the alternating waveform. The output pulses generated are utilized to supply gating pulses for the controlled switching devices of the inverter and thereby control the frequency of operation and of the inverter. By maintaining the phase angle constant with respect to each half cycle of the alternating waveform at which the controlled devices are activated, the output voltage across the tuned load may be maintained substantially constant as desired for the controlled heating of the workpiece heated in the induction heating coil.

The circuitry described in the copending application is operative to provide the pulses at a fixed phase angle independent of amplitude and frequency of the sinusoidal waveform within certain limits. However, due to the application of the instantaneous value of the alternating waveform to the semiconductor device, the maximum amplitude limits of the alternating voltage are limited to the maximum voltage rating of the particular device utilized, for example, the maximum interbase voltage if a unijunction transistor is utilized as the comparison device. This limits the maximum to minimum amplitude range of the alternating voltages that can be sensed by the circuit in that the lower amplitude limit is fixed to a value where the forward drop of the peak detector diode of the pulse generating circuit becomes an appreciable fraction of the sensed alternating voltage. It would therefore be highly desirable if a pulse generating circuit could be provided wherein the amplitude range could be increased by a substantial factor to for example at least 100:1.

SUMMARY OF THE INVENTION

The present invention provides new and improved pulse-generating circuitry for generating a pulse at a selected phase angle with respect to an alternating waveform by the comparison of the instantaneous value of the waveform with a signal proportional to the peak magnitude of the alternating waveform. The comparison is made in a comparison stage which is supplied with operating voltage from a source independent of the alternating waveform thereby isolating the comparison stage from the amplitude of the alternating waveform. The output pulses are thereby generated at the selected phase angle over a wide range of variations in the amplitude of the alternating waveform

DESCRIPTION OF THE PREFERRED EMBODIMENT

Figure 1:
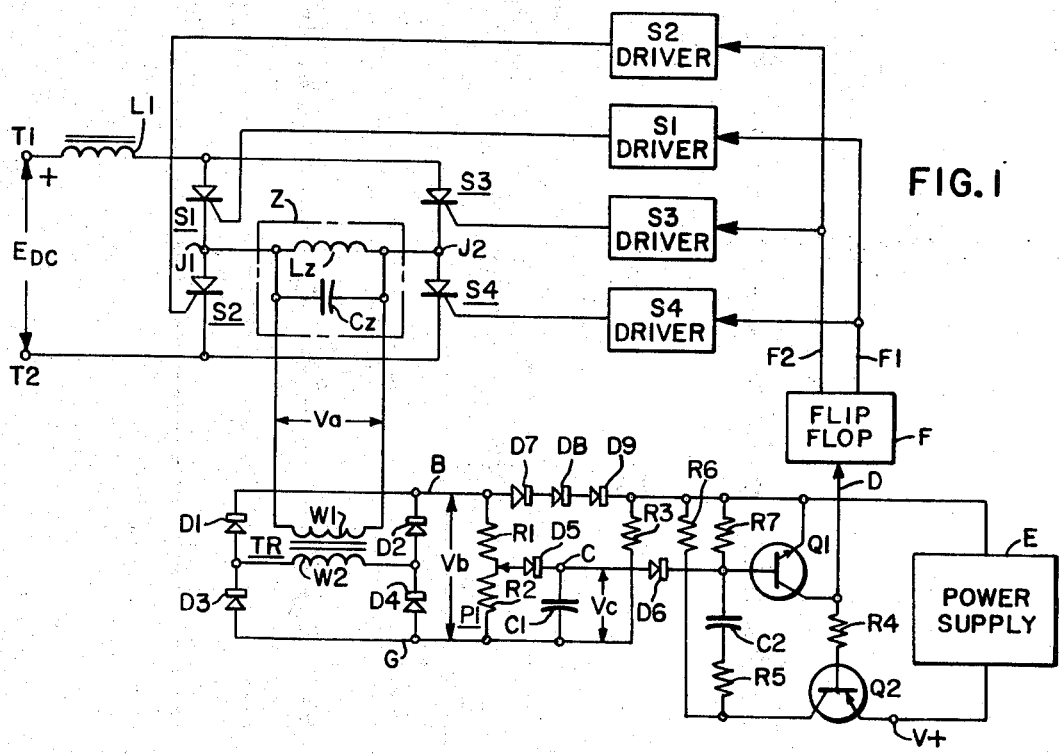
FIG. 1 is a schematic block diagram of the pulse-generating circuit of the present invention incorporated into induction heating apparatus.

In FIG. 1 induction heating apparatus is shown utilizing an inverter drive for supplying a parallel tuned load Z including an induction heating coil Lz and a capacitor Cz connected in parallel circuit relationship therewith. In order to heat a workpiece, it is placed in the magnetic field of the induction heating coil Lz for inducing eddy currents therein as is well known in the induction heating art. The tuned resonant frequency of the parallel combination of the heating coil Lz and the capacitor Cz is so selected to have a predetermined value for the desired heating application. The inverter for supplying the tuned load includes four controlled switching devices S1, S2, S3 and S4 arranged in a two-leg bridge array. The controlled switching devices may for example comprise silicon-controlled rectifiers or other equivalent devices. The controlled switching devices S1 and S2 are connected in the first leg of the bridge, with a junction J1 being formed therebetween at the cathode anode junction thereof. Devices S3 and S4 are connected in the second leg of the bridge array, with the junction J2 being formed at the cathode anode junction thereof. The load Z is connected between the junctions J1 and J2 with the two legs of the bridge. The inverter is provided with a DC supply voltage $E_{DC}$ which is supplied between a pair of terminals T1 and T2 with the terminal T1 being positive. Between the terminal T1 and the anode electrode of the controlled rectifiers S1 and S3, which are commonly connected, is connected a ballast inductor L1. The cathode electrodes of the devices S2 and S4 are commonly connected to the terminal T2. Bidirectional current is supplied through the load Z by the selective switching of alternate pairs of the controlled rectifiers. That is, during the first half cycle the controlled rectifier pair S1—S4 is gated on while the controlled rectifier pair S2—S3 is commutated off; and then during the next half cycle, the controlled rectifier pair S2—S3 is gated on and the controlled rectifier pair S1—S4 is turned off. The commutation of a pair of controlled rectifiers is effected via the load capacitor Cz reverse biasing that pair once the other pair of controlled rectifiers is turned on. The reverse biasing of the previously conductive pair of devices turns them off and resets the inverter for the next cycle of operation. The ballast inductor L1 in series with the respective pairs of controlled rectifier devices acts as a current limiting coil, aids in supplying a substantially constant curve to the load Z and smooths out any sudden current excursions due to the switching action of the controlled devices. The operation of the inverter is such that a substantially constant current, the magnitude of which is determined by the source voltage $E_{DC}$ and the effective load resistance in parallel with Cz and Lz, is switched into the parallel tuned circuit Lz—Cz in opposite directions during alternate half cycles. Thus, with a square wave of current being switched into the tuned load, a sinusoidal voltage Va is developed thereacross which is shown as the voltage waveform Va in curve A of FIG. 2.

The instantaneous value of this voltage Va may be defined by the equation:

$$Va = V'a \sin \theta$$

where $V'a$ is the peak value of the sinusoidal waveform and $\theta$ is the angular displacement thereof. On a time base $\theta$ would be equal to $2\pi ft$, where $f$ is the frequency of the waveform and $t$ is time. If the ratio of the instantaneous value Va to the peak value $V'a$ is taken, we find:

$$\frac{Va}{V'a} = \frac{V'a \sin \theta}{V'a} = \sin \theta.$$

It can thus be seen that the ratio of the voltage Va at a given phase angle $\theta$ to the peak voltage $V'a$ of the sine wave is not a function of either amplitude or frequency of the sine wave. Therefore, by the comparison of the instantaneous value of the sine wave with its peak value, an indication can be obtained when this ratio reaches a predetermined value which will be indicative of a predetermined phase angle. In other words, when the ratio of the instantaneous to peak voltage is a given value, independent of amplitude of frequency of the sinusoid, the waveform will be at a predetermined phase angle.

The circuitry as shown in FIG. 1 uses this concept for providing an output pulse whenever the ratio of instantaneous to peak value of the sine wave reaches a desired value. The output pulses thus generated are indicative of a selected phase angle delay with respect to the particular half cycle of the sine wave being sensed independent of the amplitude and frequency of the half cycle sensed.

It should be understood that the wave shape $Va$ may not be exactly a sinusoid, but, due to the finite switching times of the controlled rectifiers S1, S2, S3 and S4 and being gated on and commutated off, the wave shape may differ somewhat from a pure sinusoid. However, this does not substantially effect the operation's circuitry as discussed herein.

Figure 2:
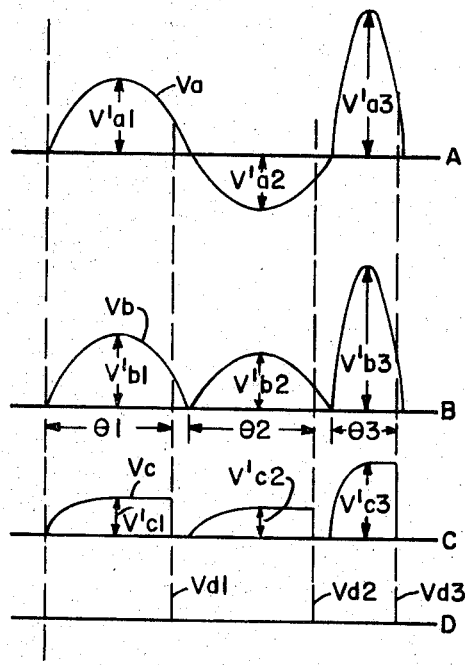
FIG. 2 is a waveform diagram including curves A, B, C and D which are utilized in explaining the operation of FIG. 1.

The waveform $Va$ as shown in curve A of FIG. 2 is applied to the primary winding W1 of a sensing transformer TR. The transformer TR has a secondary winding W2 with the respective ends thereof connected at the input of a full wave bridge including diodes D1, D2, D3 and D4 between the anode-cathode junctions of the diodes D1—D3 and D2—D4, respectively. The cathodes of the diodes D1 and D2 are commonly connected at a point B, and the anodes of the diodes D3 and D4 are commonly connected at a point G, so that a full wave rectified output voltage $Vb$ is developed between the points B and G. The full wave rectified output voltage of the diode bridge is shown as the voltage waveform $Vb$ in curve B of FIG. 2.

The voltage $Vb$ is applied across a potentiometer P1 which includes a resistive section R1 between the point B and the slider thereon and resistive section R2 between the slider and the point G. The voltage appearing across the resistor R2 may be selected by adjusting the slider to the desired ratio of R2:R1 + R2. The fraction of the total voltage $Vb$ which appears across the resistive section R2 is utilized to select the phase angle delay at which output pulses are generated in the pulse-generating circuit as will presently be discussed.

A peak detector including a diode D5 and a capacitor C1 is provided for peak detecting the voltage developed across the resistive section R2. The anode of the diode D5 is connected to the slider on the potentiometer P1, with the capacitor C1 being connected between the cathode of the diode D5 at a point C and the point G. A peak detected signal voltage $Vc$ is developed across the capacitor C1 between the points C and G as shown in FIG. 1. The waveform of the voltage $Vc$ is shown in curve C of FIG. 2. Thus, as can be seen by comparing curves B and C of FIG. 2, the voltage $Vc$ follows the instantaneous value of the voltage $Vb$ until the peak of the waveform $Vb$ at $\theta = 90°$. The peak value $V'c$ of the voltage $Vc$ is then maintained due to the blocking action of the diode D5 preventing the capacitor C1 from discharging and no other discharge path being provided for the capacitor C1. The peak voltage $V'c$, which is proportional to the peak amplitudes of the voltages $Va$ and $Vb$, is maintained until the predetermined relationship is reached in a comparison stage as shown in FIG. 1.

The comparison stage includes a transistor Q1 and transistor Q2 of a PNP type, with voltage $Vc$ being applied to the base of NPN type transistor Q1 via a diode D6 which is connected from anode to cathode, respectively, between the point C and the base of the transistor Q1.

The other quantity to be compared is the instantaneous value of the waveform $Vb$ which is applied to the emitter electrode of the transistor Q1 through three diodes D7, D8 and D9 which are connected in series from anode to cathode between the point B and the emitter of the transistor Q1. The three diodes D7, D8 and D9 are utilized to compensate for the two diode forward voltage drops due to the diodes D5 and D6 and the base-emitter junction drop of the transistor Q1. Thus the comparison between the detected peak voltage $V'c$ and the instantaneous voltage $Va$ will have the same number of forward junction drops as seen at the emitter of the transistor Q1.

A resistor R3 is connected between the emitter of the transistor, Q1 and the point G. A separate power supply E is provided for the comparison stage having its positive output connected to the emitter electrode of the transistor Q2 which was of the PNP type and the negative terminal of the power supply E connected to the emitter of the transistor Q1, so that a voltage V+ is established between the emitter of the transistor Q2 and the emitter of the transistor Q1. The power supply E provides the Voltage V+ completely independent of the sensed voltage $Va$; thus the comparison stage including the transistor Q1 and Q2 never sees more than the voltage V+ acting as its operating potential which may be of a relatively low value, for example, +24 volts. On the other hand, the magnitude of the sensed voltage $Va$ is limited only by the voltage ratings of the diodes D1, D2, D3 and D4 in the full wave rectifier bridge, and diodes D5 and D6. Since diodes with voltage ratings in excess of 600 volts are presently available on the market, the voltage $Va$ may have an RMS value of 400 volts or higher if such diodes are used in the circuitry of FIG. 1.

In the comparison stage the peak detector voltage $V'c$ is supplied via the diode D6 to the base of the transistor Q1 and compared with the instantaneous value of the voltage waveform $Vb$ at the emitter of the transistor Q1. When the instantaneous value of the voltage $Vb$ drops below the peak detected value $V'c$, the base-emitter junction of the transistor Q1 will be forward biased and the transistor will begin to conduct. Considering the first half cycle on the curves of FIG. 2, the first half cycle of the waveform $Va$ has a peak magnitude $V'a1$ causing a peak magnitude $V'b1$ for the full wave rectified waveform $Vb$. According to the setting on the potentiometer P1, the voltage across the resistor R2 is peak detected via the diode D5 and capacitor C1 so that a peak voltage $V'c1$ appears across the capacitor C after $\theta = 90°$ of the first half cycle. The voltage $V'c1$ will continue to be applied via the diode D6 to the base of the transistor Q1 until a phase angle $\theta$ from the beginning of the half cycle is reached. The voltage $Vb$ applied to the emitter of the transistor Q1 through the diodes D7, D8 and D9, however, decreases after $\theta = 90°$ and at the angle $\theta 1$ the magnitude of this voltage is smaller than the voltage $V'c1$ applied to the base of the transistors Q1. Thus the transistor Q1 begins to conduct. The transistors Q1 and Q2 form an AC coupled regenerative PNP—NPN circuit with a resistor R4 being connected between the base and collector electrodes of the transistors Q2 and Q1, respectively and with a resistor R5 connected in series with a capacitor C2 between the collector and base of the transistors Q2 and Q1, respectively. As the transistor Q1 begins to conduct the transistor Q2 also begins to conduct since the base electrode thereof is connected to the collector of the transistor Q1 via the resistor R4. Thus, additional base current is supplied to the transistor Q1 through the emitter-collector circuit of transistor Q2 from the V= voltage source E through the resistor R5 and the capacitor C2 to the base of the transistor Q1. This additional current causes the transistor Q1 to be driven more heavily into conduction. The regenerative action continues since as the transistor Q1 becomes more conductive the base of the transistor Q2 being coupled to the collector of the transistor Q1 is driven to a lower voltage so that the transistor Q2 becomes more heavily conductive and supplies more current in turn to the base of the transistor Q1. Thus, a pulse output is provided from the collector of the transistor Q1 a very short time after the predetermined comparison of the instantaneous value of the voltage $Vb$ and the peak detected value $V'c1$ at the angle $\theta 1$ to supply an output pulse voltage $Vd1$ at the point D which is supplied to a flip-flop F.

The capacitor C1 is discharged through the base-emitter circuit of the transistor Q1 and the resistor R3, with the transistors Q1 and Q2 reverting to its nonconductive state after this discharge. Any charge on the capacitor C2 is discharged through the resistor R5, a resistor R6 connected between the collector of the transistor Q2 and the emitter of the transistor Q1 and a resistor R7 connected between the emitter and base of the transistor Q1. The comparison circuit is thus now reset for the next half cycle of operation.

The flip-flop F is operative to provide output pulses alternately from outputs F1 and F2 in response to an input applied at the point D. Assume that prior to the generation of the pulse $V'd1$ that the flip-flop F was in its F1 output state so that gate drive had been supplied from its F1 output through an S1 driver and an S4 driver to the respective gate electrodes of the controlled rectifier pair S1—S4 rendering this pair conductive during the first half cycle of operation as described with reference to FIG. 2. When the pulse $V'd1$ is applied to the input of the flip-flop F, it changes output states to supply an output pulse at its F2 output, which is applied to an S2 and S3 driver for supplying gate drive pulses to the controlled rectifier pair S2—S3 thereby turning on these devices. The controlled rectifier pair S1—S4 is commutated off by the reverse bias applied thereacross from the capacitor Cz. With the controlled pair S2—S3 turned on, the inverter is now set for the next half cycle of operation with the current being supplied to the load Z in an opposite direction to the previous half cycle.

For purpose of illustration assume that the next half cycle as shown in curve A of FIG. 2 has a negative peak magnitude $V'a2$ which is of a lower magnitude than the peak magnitude $V'a1$ of the previous half cycle but of the same frequency. The second half cycle is rectified in the full wave rectifier via the diodes D1—D4 and appears at the point B in FIG. 1 as the waveform of curve B of FIG. 2 having a peak magnitude $V'b2$. A portion of this waveform is peak detected to supply the voltage waveform as shown in curve C of FIG. 2 having a peak magnitude $V'c2$ which is of a lower magnitude than the preceding half cycle peak magnitude $V'c1$. The peak value $V'c2$ is compared with the instantaneous value $Vb$ of the second half cycle as shown in curve B of FIG. 2, and, when the instantaneous value drops below the peak value $V'c2$, the transistor Q1 will begin to conduct. Under the regenerative action of the transistor Q2, the transistor Q1 will be turned on very rapidly to supply an output pulse $V'd2$ as shown in curve D of FIG. 2 at a phase angle delay $\theta2$ measured from the beginning of that half cycle. Even though the peak magnitude $V'c2$ is smaller than the first half cycle peak magnitude $V'c1$, angle $\theta2$ will be equal to the angle $\theta1$. This can be seen in that the transistor Q1 is rendered conductive when the voltage at its emitter with respect to the base is at a predetermined relationship independent of the instantaneous magnitude of the sensed waveform $Va$. Thus the output pulse $Vd2$ generated at the same phase angle delay as was the pulse $Vd1$ with respect to the corresponding beginning of each of the half cycles.

In response to the pulse $V'd2$ being generated, the flip-flop F reverts to its F1 output stage to supply output pulses therefrom to the S1 and S2 drivers, respectively, to gate on the S1—S4 pair of controlled rectifier devices. The rectifier pair S2—S3 is thereby commutated off, the inverter being set for the next half cycle of operation.

During the next half cycle assume that the voltage $Va$ has its amplitude doubled with respect to the first half cycle and also its frequency doubled. As shown in curve A of FIG. 2 the peak amplitude of the third half cycle is shown to be $V'a3$ which is double that of the first half cycle. Thus the peak amplitude of the full wave rectified waveform appearing between the points B and G of FIG. 1 will be doubled and is illustrated as the peak voltage $V'b3$ in curve B of FIG. 2. A portion of the waveform putting a peak magnitude $V'b3$ is peak detected to supply a voltage having a peak magnitude $V'c3$ as illustrated in curve C of FIG. 2. The peak magnitude $V'c3$ is supplied via the diode D6 to the base of the transistor Q1 and the instantaneous value at this time is supplied through the diodes D7, D8 and D9 to the emitter of the transistor Q1, with the transistor Q1 being turned on when the instantaneous value of the voltage $Vb$ drops below the value $V'c3$ which occurs at a phase angle $\theta3$.

A pulse $Vd3$ is generated at the time the phase angle $\theta3$ as illustrated in curve D of FIG. 2. The angle $\theta3$ is equal in degrees from the beginning of that half cycle to the angles $\theta1$ and $\theta2$ since the transistor Q1 began to conduct when the same relationship is established between the base and emitter electrodes thereof, which is constant. That is, what is compared is the instantaneous value of the sinusoid to its peak magnitude which is a constant for a selected phase angle. Thus, even though the output pulse $Vd3$ is generated sooner on a time base than the pulses $Vd1$ and $Vd3$ from the beginning of the respective half cycles, it is generated at the same phase angle delay from the beginning of the respective half cycles even though the frequency of the third half cycle is double that of the previous two half cycles.

The output pulse $Vd3$ is supplied to the flip-flop F switching the output state thereof to its F2 output with this pulse being applied to the S2 and S3 drivers which in turn gate on the controlled rectifier pair S2—S3. The controlled rectifier pair S1—S4 is commutated off, and the inverter is reset for the next half cycle of operation.

During subsequent half cycles output pulses will be supplied by the comparator transistor Q1 after the same phase angle delay measured from the beginning of the respective half cycle independent of the amplitude or frequency of the sensed voltage $Va$. The amplitude range over which the circuitry of FIG. 1 is operative is the order of a 100:1 in that the maximum amplitude of voltage $Va$ that can be sensed is limited only by the power ratings of the bridge diodes D1, D2, D3 and D4. The use of the power supply E which supplies its output voltage V+ independent of the voltage $Va$ permits the sensing of the high voltage levels for the voltage $Va$. The minimum voltage level that may be sensed is limited by the voltage at which the forward diode drops the diodes D5 and D6 in series with the base of the transistor Q1 become an appreciable fraction of the sensed voltage. As to the range of frequencies over which the described pulse generating circuitry is operative, the upper frequency is limited by the time constant which will permit the charging of the capacitor C1 to substantially peak amplitude during each half cycle, and at the lower frequency end is limited by the leakage from the capacitor C1 subsequent to the peak detection.

The pulse-generating circuit for generating a pulse at a fixed phase angle independent of frequency and amplitude of the voltage being sensed has been described as being incorporated into induction heating apparatus. However, it should be understood that the circuitry could be used in many other applications requiring the generation of pulses or under indications at a fixed or selected phase angle delay for control or other purpose and wherein the amplitude of the sensed voltage may vary over wide ranges.

Although the present invention has been described with a certain degree of particularity, it should be understood that the present disclosure has been made only by way of example and that numerous changes in the details of construction and the combination arrangement of parts, elements and components can be resorted to without departing from the scope and the spirit of the present invention.

We claim:
1. A circuit for providing an output signal at a selected phase angle with respect to an alternating signal which may vary in amplitude and frequency comprising:
   detecting means for providing a detected signal proportional to the substantial peak magnitude of said alternating signal and in phase with said alternating signal;
   comparison means;
   a power supply for applying operating potential to said comparison means independent of said alternating voltage;
   first means for applying the instantaneous value of said alternating signal to a first input of said comparison means;
   second means for applying said detected signal to a second input of said comparison means; and said comparison means being operative to provide said output signal from an output thereof when said instantaneous value and said detected signal bear a predetermined relationship with respect to each other.

2. The circuit of claim 1 wherein:
said detected signal being proportional to the substantial peak magnitude of each half cycle of said alternating signal; and
said comparison means being operative to provide said output signal during each half cycle at said selected phase angle after the peak magnitude has been reached and said predetermined relationship exists.

3. The circuit of claim 2 wherein: said comparison means including a switching device having a plurality of electrodes, said first and second inputs being first and second electrodes of said switching device, respectively, and said output being a third electrode thereof.

4. The circuit of claim 3 wherein said switching device comprising a first transistor and said predetermined condition being established when said instantaneous value drops below the amplitude of said detected signal.

5. The circuit of claim 4 wherein said comparison means including a second transistor being connected in a regenerative circuit relationship with said first transistor so that said first transistor provides said output signal rapidly in response to said predetermined relationship being established.

6. The circuit of claim 4 wherein said detecting means including a capacitor for storing said detecting signal and a first unidirectional device for maintaining said detected signal magnitude until said predetermined relationship exists.

7. The circuit of claim 6 including:
means for full wave rectifying said alternating signal; and
means for supplying a selected portion of the full wave rectified signal to said detecting means, said means for supplying being adjustable to vary said selected phase angle.

8. The circuit of claim 7 wherein:
said first means including a second unidirectional device for isolating said power supply from said detecting means and being operatively connected in series between said first unidirectional device and said first electrode; and
said second means including a plurality of unidirectional devices operatively connected in series between said means for full wave rectifying and said second electrode for compensating for the voltage drops across said first and second unidirectional devices and the junction drop of said first transistor.

9. In induction heating apparatus utilizing an inverter having a plurality of controlled switching devices for supplying an alternating signal to a tuned load, the combination of:
1. means for sensing said alternating signal developed across said load;
2. a pulse-generating circuit for providing an output signal at a selected phase angle with respect to said alternating signal and comprising:
  a. detecting means for providing a detected signal proportional to the substantial peak magnitude of said alternating signal and in phase with said alternating signal;
  b. a comparison stage;
  c. a power supply for supplying operating potential to said comparison stage independent of said alternating voltage;
  d. first means for applying the instantaneous value of said alternating signal to a first input of said comparison stage;
  e. second means for applying said detected signal to a second input of said comparison stage;
  said comparison stage being operative to provide said output signal from an output thereof when said instantaneous value and said detected signal bear a predetermined relationship with respect to each other; and
3. means for utilizing said output pulse from said pulse generating circuit for controlling the switched state of said plurality of controlled switching devices of said inverter.

10. The combination of claim 9 wherein:
said detected signal being proportional to the substantial peak magnitude of each half cycle of said alternating signal, and
said comparison stage being operative to provide said output signal during each half cycle at said selected phase angle after the peak magnitude has been reached and said predetermined relationship exists.